(12) United States Patent
Kapadi et al.

(10) Patent No.: US 7,610,114 B2
(45) Date of Patent: Oct. 27, 2009

(54) ORDER CHARTING FOR FLAT SHEET INDUSTRIES

(75) Inventors: Mangesh D Kapadi, Bangalore (IN); Lingathurai Palanisamy, Bangalore (IN); Pragathieswaran Shanmugavelu, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 439 days.

(21) Appl. No.: 11/287,939

(22) Filed: Nov. 28, 2005

(65) Prior Publication Data

US 2007/0120357 A1    May 31, 2007

(51) Int. Cl.
*B42D 15/00* (2006.01)
*G06F 19/00* (2006.01)

(52) U.S. Cl. ............... 700/122; 700/127; 700/128; 700/129; 242/520; 162/289; 241/152.1

(58) Field of Classification Search ......... 700/122, 700/127–129; 242/520; 162/289; 241/152.1
See application file for complete search history.

(56) References Cited

U.S. PATENT DOCUMENTS

| 5,238,269 | A | 8/1993 | Levine | |
|---|---|---|---|---|
| 6,772,037 | B2 * | 8/2004 | Palanisamy et al. | 700/127 |
| 2006/0197769 | A1 * | 9/2006 | Lee | 345/563 |

OTHER PUBLICATIONS

Westerlund et al (Solving a two-dimensional trim-loss problem with MILP)—European Journal of Operational Research 104 (1998).*

Harjunkoski et al (Different formulations for solving trim loss problems in a paper-converting mill with ILP)—Computers chem. Engng vol. 20—1996.*

F. Vanderbeck, "A Nested Decomposition Approach to a Three-Stage, Two-Dimensional Cutting-Stock Problem", Management Science © 2001 Informs vol. 47, No. 6, Jun. 2001 pp. 864-879.

R. Klempous et al., "Interactive procedures in large-scale two-dimensional cutting stock problems", Journal of Computational and Applied Mathematics 66 (1996) pp. 323-331.

E. J. Zak, "Row and column generation technique for a multistage cutting stock problem", Computers & Operations Research 29 (2002), pp. 1143-1156.

P. E. Sweeney et al., "One-dimensional cutting stock decisions for rolls with multiple quality grades", European Journal of Operational Research 44 (1990), pp. 224-231.

M. Hifi et al., "An Exact Algorithm for Constrained Two-Dimensional Two-Staged Cutting Problems", Operations Research vol. 53, No. 1 Jan.-Feb. 2005, pp. 140-150.

H. H. Yanasse et al., "Two-dimensional Cutting Stock with Multiple Stock Sizes", Journal of the Operational Research Society, 42 pp. 673-683.

M. P. Johnson et al., "Skiving Addition to the Cutting Stock Problem in the Paper Industry", © 1997 Society for Industrial and Applied Mathematics, vol. 29, No. 3, pp. 472-483.

(Continued)

*Primary Examiner*—Michael D Masinick
(74) *Attorney, Agent, or Firm*—Schiff Hardin LLP (57) ABSTRACT

Raw rolls and/or sheets of flat sheet stock are charted by a processing system that generates charting patterns using constraint logic programming, that matches the charting patterns and available raw rolls and/or sheets of flat sheet stock, and that selects the optimal patterns from those matching charting patterns and available raw rolls and/or sheets using mixed integer linear programming.

43 Claims, 3 Drawing Sheets

OTHER PUBLICATIONS

E.J. Zak, "The skiving stock problem as a counterpart of the cutting stock problem", Intl. Transactions in Operational Research 10, (2003) pp. 637-650.

G. Scheithauer et al., "The modified integer round-up property of the one-dimensional cutting stock problem", European Journal of Operational Research 84 (1995) pp. 562-571.

* cited by examiner

ORDER CHARTING FOR FLAT SHEET INDUSTRIES

TECHNICAL FIELD OF THE INVENTION

The present invention relates to filling demand for various flat-sheet product rolls and sheets either fully or partially from available stock of product and raw rolls and sheets.

BACKGROUND OF THE INVENTION

Typical flat sheet manufacturing involves the manufacturing of known sized raw rolls and sheets of flat-sheet stock. Raw flat sheet stock includes raw rolls and/or sheets and has varying widths, diameters (or length), quantity, and quality. The flat sheet stock, for example, may be steel, paper, aluminium, dry film, etc. The width and diameter (or length) of these known sized raw rolls and sheets depends on the specifications of the machines that produce them. On the other hand, customers often order product rolls and sheets that have smaller dimensions and that cannot be directly satisfied by the known sized raw rolls and sheets produced by flat sheet manufacturers. Therefore, flat sheet stock frequently must be unwound from the known sized raw rolls, cut and/or trimmed, and rewound into product rolls and/or product sheets that satisfy customer demand.

The process of cutting the larger known sized raw rolls and sheets into smaller product rolls and/or sheets as specified by customer orders is typically referred to as trimming, cutting, and/or charting, depending on the type of flat sheet industry. However, for convenience only, the term charting will be used herein to mean trimming, cutting, or charting. Alternatively or additionally, the term charting includes the determination of the necessary patterns according to which available raw rolls and sheets are processed to fill customer orders.

Charting is carried out using a set of specific equipment in various flat sheet industries. This equipment is generally referred to as secondary processing equipment, and the process of charting is generally referred to as secondary processing. Secondary processing could be implemented in either one step or multiple steps depending on the specific dimensions needed to be charted. Multiple steps are typically required due to inherent limitations of the various secondary processing equipment in terms of its capability of handling different dimensions.

Charting of raw rolls and sheet stock is currently performed manually or using in-house developed solutions to fill customer orders of different widths and diameters (or lengths). The attributes of the customer orders are typically width, diameter (or length), ordered quantity (within certain tolerances), and product type. Not all available raw rolls and sheets are usually used to fill customer orders. Therefore, the raw rolls that are available to fill any specific customer order often have varying ages (number of days to live before the stock expires).

Also, charting is typically carried out multiple times a day (e.g., a separate charting for each shift) to avoid complexity. As a result, the overall charting efficiency is poor.

Further, in the manual process, good raw rolls are charted while the defective raw rolls are not. Accordingly, generally a larger quantity of raw stock is maintained available as is necessary to fill customer orders. Thus, the cost of inventory and the waste caused by not using defective raw rolls are substantial.

On average, 10% of all manufactured raw rolls have single or multiple defects. The defect is measured as the portion of roll width along the length of the rolls. Raw roll defects are mainly of two types, major defects and minor defects. Any area of the flat sheet stock containing a major defect is not a good product and cannot be used as part of the sale. However, areas of the flat sheet stock containing a minor defect may still be good product. A defect is considered a minor defect if a cutting knife applied to an area of flat sheet stock causes a major defect in this area. Product having minor defects can be regarded as good product, and any areas containing minor defects can be part of a sale as long as a knife is not applied to the portion having the minor defect during charting.

The objective of the charting process is to minimize loss (i.e., to minimize the unused portion of raw rolls following charting) and to maximize the utilization of available stock of product and raw rolls and sheets while producing product rolls or sheets meeting customer order specifications. As mentioned above, at present charting is mostly performed manually so that the efficiency of the charting process is based on the skills of the operators.

As can be seen from the above discussion, the charting of raw rolls to fill customer orders is complex when trying to minimize loss and maximize the utilization of stock. The flat-sheet industry requires a robust, efficient, and consistent charting process for their production facilities to meet their customer demands and to improve their operational efficiency.

SUMMARY OF THE INVENTION

According to one aspect of the present invention, a method is provided of charting raw rolls and/or sheets of flat sheet stock. The method is implemented by a processing system and comprises the following: generating charting patterns using constraint logic programming; matching the charting patterns and available raw rolls and/or sheets of flat sheet stock; and, selecting the optimal patterns from those matching charting patterns and available raw rolls and/or sheets using mixed integer linear programming.

According to another aspect of the present invention, a method is provided of charting raw rolls and/or sheets of flat sheet stock. The method is implemented by a processing system and comprises the following: generating charting patterns relative to good raw rolls and/or sheets of flat sheet stock and defective raw rolls and/or sheets of flat sheet stock using constraint logic programming; matching the charting patterns and available good and defective raw rolls and/or sheets of flat sheet stock; and, selecting optimally matching charting patterns and available good and defective raw rolls and/or sheets of flat sheet stock so as to maximize the utilization of the defective raw rolls and/or sheets of flat sheet stock.

According to still another aspect of the present invention, a computer readable memory has program code stored thereon which, when executed, performs the following functions: generating charting patterns using constraint logic programming; matching the charting patterns and available raw rolls and/or sheets of flat sheet stock; and, selecting optimally matching charting patterns and available raw rolls and/or sheets so at to minimize waste of the available raw rolls and/or sheets.

BRIEF DESCRIPTION OF THE DRAWINGS

These and other features, aspects, and advantages of the present invention will become better understood when the following detailed description is read with reference to the accompanying drawings in which.

DETAILED DESCRIPTION

Although the invention is described below with particular reference to the charting of raw rolls of flat sheet stock to produce product rolls, it should be understood that the present invention also pertains to the charting of raw sheets of flat sheet stock to produce product sheets and further also pertains to the charting of a mix of raw rolls and sheets of flat sheet stock to produce product rolls and/or sheets.

The present invention is directed to the minimization of waste (trim loss) and/or maximization of stock utilization during charting. Waste minimization and effective utilization of stock can be realized by use of an optimization model that solves the charting problem involving a large number of customer orders (of varying width, diameter/length, quantity, and/or product type). One objective of this optimization model problem, for example, may be to maximize charting efficiency while filling customer orders from a known group of raw rolls of flat sheet stock. An additional or alternative objective of this optimization model is to maximize stock utilization.

One or more operational requirements and constraints may be considered in determining an optimized charting. A first such operational requirement might be to fill a customer order from raw rolls of the same style/grade. However, alternate style/grade rolls could be used to fill a customer order in order to improve yield and/or to meet the ordered quantity of a "must fill" customer order. It is desirable to use alternate style/grade rolls only when the charting efficiency would otherwise be not within the acceptable limits of the user.

A second operational requirement might be to completely fill all "must fill" firm customer orders and to fill other firm customer orders and/or standard orders only to improve trim yield. Standard orders are orders of frequently ordered sizes but are not firm customer orders. It is desirable to fill other firm customer orders on priority over standard orders.

A third operational requirement might be to allow the use of, or the addition to, stock for standard orders if it helps to improve charting efficiency. However, it is desirable that stock levels for standard orders not go below safe limits and not exceed peak limits set by the user. Thus, there are two types of stock, stock of raw rolls and stock of product rolls and sheets. The stock of product rolls and sheets have standard sizes and can be directly added to pertinent customer orders without any processing.

A fourth operational requirement might be to consider the width of the raw roll consumed by each knife, the lower and upper limits on blade separation, and also the maximum number of knives used by secondary processing equipment. Consumption of the width of a raw roll due to the knife and minimum blade separation and maximum number of knives might be considered when determining the cutting patterns for raw rolls.

A fifth operational requirement might be to use all raw rolls that are about to expire or that are marked as "must use" irrespective of yield. Thus, the optimization model could balance the preference to maximize yield against the preference to use older raw rolls.

A sixth operational requirement might be to consider the position of defects while using a roll having major and/or minor defects during the charting. The optimization model can be arranged to maximize the available width of a defective roll while at the same time avoiding applying a trimming or cutting knife in the areas of minor defects.

A seventh operational requirement might be to avoid the use of the same charting pattern when cutting two orders for rolls of different outside diameters (and thus different lengths) so as to avoid lengthwise wastage.

An eighth operational requirement might be to avoid putting a partial raw roll back into stock. If used, it is desirable to use the full length of a raw roll.

A ninth operational requirement might be to add any extra length, which is left on a raw roll after cutting the nominal length for all charting patterns assigned for that particular raw roll, among all the selected patterns so long as the extra length does not exceed the allowed length tolerances.

A tenth operational requirement might be to cut more than one pattern from a single raw roll. However, an upper limit can be enforced on the total number of distinct patterns that can be cut from a raw roll. If this upper limit is set to one, not more than one distinct pattern is allowed for a raw roll, though the same pattern can be repeated for that raw roll. This process is referred to as "one deep charting." If this upper limit is more than one, different patterns can be cut from a raw roll. This process is referred to as "two deep charting." If these different patterns belong to different outer diameter (different length) orders, the process will be called as two deep mixed length charting. The charting model should provide the user the flexibility to select the cutting strategy.

An eleventh operational requirement might be to put any excess width (loss) left on one raw roll towards the edges of the raw roll. For example, if 8" from the actual width remains on a raw roll, 4" should go to either side of center of the good product rolls unless moving the product rolls to the center of the raw roll makes a knife position fall into a minor defect. Accordingly, this requirement means that a product roll is cut from the center of a raw roll if the product roll to be cut is less wide than the raw roll, assuming that there are no minor defects in the raw roll.

A twelfth operational requirement might be to join two or more raw rolls of the same width to produce a longer product roll (this process is called splicing). The optimization model can be arranged to consider splicing while charting.

Apart from the above operational requirements, various other additional operational requirements and/or constraints might be considered dependent on the secondary processing equipment used in the particular flat sheet industry (e.g., minimum back stand load on sheeter, number of stacks in sheeter, edge trim, etc.). The optimization model can be arranged to consider these operational requirements and/or constraints as well.

In formulating the optimization problem, the filling of J customer orders from a known group of raw rolls I can be considered. The styles for the raw rolls and for the customer orders are assumed to be the same. However, this assumption is made for convenience only, and the styles for the raw rolls and for the customer orders need not be the same. Each customer order j specifies a width $W_j$, a nominal length $L_j$ (or diameter $D_j$), and a quantity $Q_j$. The quantity produced for customer order j is required to be within given tolerances specified by a lower quantity limit $Q_{jmin}$ and an upper quantity limit $Q_{jmax}$. It should be noted that, if an order is an optional order, the minimum order quantity $Q_{jmin}$ for that particular order can be set equal to zero. The length for each product roll (the roll(s) to be delivered to the customer) for order j should be within a given tolerance on the nominal length specified as within $L_{jmax}$ and $L_{jmin}$.

Each raw roll i, from the set I of raw rolls, corresponds to a width $WI_i$, a length $LI_i$, a quantity $QI_i$, and a number of days to live $\lambda I_i$. The parameter $\delta_i$ indicates whether a raw roll i is a defective roll or is a good quality roll. The start and end of the defects in a defective raw roll i are captured in a couple of two dimensional matrices, $S\Delta_{i,k}$ and $E\Delta_{i,k}$, while $T\Delta_{i,k}$ indicates the type of the defect, where i∈I, and k=1, . . . , $\delta_i$. The parameter $\delta_i$ is equal to the number of defects in input roll i.

The cutting pattern is defined as a set of product rolls (i.e., ordered rolls) to be charted out of one or more input parent rolls. The parameter P represents all possible cutting patterns for all customer orders under consideration. The width of each cutting pattern p should, of course, be less than the width of the raw roll. The number of product rolls in each cutting pattern should not exceed a given number $\eta_{max}$.

Each raw roll is characterized by width, length, and number of defects. All of the good quality raw rolls (raw rolls with zero defects) can be grouped into a few distinct groups. The grouping of good raw rolls is mainly based on width and length of the raw rolls. Thus, the good raw rolls having different widths and/or lengths will belong to different groups. It should be noted that the tolerance given on the nominal length of the orders allow raw rolls with nearly the same lengths to be put into the same group. However, if the variation in length is high for two good raw rolls having the same width, these two raw rolls belong to different groups.

It may be assumed, as an example, that all raw rolls are grouped into $\vec{I}$ number of distinct groups. Here, $N_{\vec{i}}$ for each group $\vec{i}$ represents the total number of raw rolls in that group. Another parameter $NE_{\vec{i}}$ is derived from $\lambda I_i$ and is used to indicate the number of raw rolls in a group $\vec{i}$ which are about to expire or are marked as "must-use" raw rolls. However, it should be noted that each defective raw roll will form a distinct group due to the unique positions of the defects in individual ones of the defective rolls.

The problem of charting customer orders onto raw rolls, as a single optimization problem, is extremely complex to solve due to the combinatorial NP-hard nature of the charting problem itself and to the dimensionality that must be considered. A combined formulation for the generation and selection of patterns to fill customer orders is unwieldy to solve due to model granularity. In order to arrive at a solution in polynomial time, the charting problem can be roughly divided into three sub-problems, (1) pattern generation according to the customer orders, (2) matching of the generated patterns to distinct raw roll groups, and (3) selection and association of patterns to raw rolls to fill the demand for customer orders.

Constraint logic programming (CLP), for example, may be applied to solve the first sub-problem. As is known, constraint logic programming involves assigning a finite set of values for each pertinent variable where the values satisfy a finite set of constraints. Linear programming (LP), for example, may be applied to solve the third sub-problem. Linear programming involves constraints and desired results that are linearly related. Linear programming has been applied to find solutions to problems with linear constraints. A further type of known linear programming is mixed integer linear programming (or MILP) and is similar to linear programming problem. However, mixed integer linear programming includes at least one constraint that is not continuous but must have an integer value.

This decomposition of the problem as set out above results in a global optimal solution as all the feasible patterns will be generated in the first step of the decomposed solution.

Pattern Generation for Good Raw Roll Groups

Assuming that two orders of differing outside diameters (and thus different lengths) cannot be cut from the same raw roll, different diameter orders are considered separately for pattern generation. Therefore, all feasible cutting patterns are generated a priori using order widths belonging to the same diameter. Each cutting pattern can be required, if desired, to satisfy the following constraints:

$$\sum_{j=1}^{J} (PO_{p,j})(W_j + \beta) - \beta = WP_p \quad \forall \, (p \in P_{\vec{i}}) \quad (1)$$

$$\vec{WI}_{\vec{i}} \geq WP_p \geq \vec{WI}_{\vec{i}\,min} \quad \forall \, (\vec{i} \in \vec{I}), \; \forall \, (p \in P_{\vec{i}}) \quad (2)$$

$$\sum_{j=1}^{J} PO_{p,j} \leq \eta_{max} \quad \forall \, (p \in P_{\vec{i}}) \quad (3)$$

where $PO_{p,j} \in Z^+$ indicates the cutting patterns, $\beta$ represents the blade consumption, and $\vec{WI}_{\vec{i}}$ is the width of the raw rolls in group $\vec{i}$. Constraint (2) restricts the width $WP_p$ of the cutting patterns for the raw roll group $\vec{i}$ to be within the limits $\vec{WI}_{\vec{i}}$ and $\vec{WI}_{\vec{i}\,min}$. Constraint (3) imposes a practical limit on the number of cutting patterns.

The length (or diameter) $LP_p$ for each pattern is equal to the nominal length (or diameter) of the orders selected to generate that particular pattern. It should be noted that the patterns found for a group of raw rolls $\vec{i}$ would form a sub-set of the patterns $P_{\vec{i}}$. Hence, the super set of the patterns P includes all the sub-sets of patterns found for all groups of raw rolls. The relationship between a pattern p and a raw roll group $\vec{i}$ is indicated by parameter, $PI_{p,\vec{i}}$, which is equal to one if the pattern p is for raw roll group $\vec{i}$. The centering of the patterns (requirement number 11 above) can also be handled during pattern generation. The parameter $PI_{p,\vec{i}}$ is logically used to map the suitable pattern and the raw rolls.

Pattern Generation for Defective Raw Roll

As mentioned above, the pattern generation for defective raw rolls has to be carried out separately because of the unique positions of the defects on the defective rolls.

Raw Rolls with Minor Defect(s)

Minor defects represent good product except in the case where a knife (while processing) applied to the area containing the minor defect causes a major defect. However, minor defects can be part of a sale if a knife is not applied in the defective area. A set of patterns $PO_{p,j}^*$ (which is a subset of the superset P) for each raw roll with minor defect(s) can be generated using the constraints (1)-(3) above. Then, each pattern from this set of patterns is sequenced using $S\Delta_{i,k}$, $E\Delta_{i,k}$, and $T\Delta_{i,k}$ to determine those patterns which do not include knife positions that fall into minor defect areas. Accordingly, any pattern which cannot be cut from a defective raw roll without the knife cutting into a defective area of the defective raw roll is deleted from the set of patterns $PO_{p,j}^*$. Hence, a defective roll with minor defect(s) will result in patterns less than or equal to the number of patterns found using the explicit enumeration procedure given by constraints (1)-(3). The patterns $PO_{p,j}^*$ are added to the patterns $PO_{p,j}$ found for the good rolls.

Raw Rolls with Major Defect(s)

Major defects do not belong to good product and hence cannot be part of the product roll. However, a raw roll with major defect(s) can be divided into sub-rolls obtained by removing the bad or defective portions of the original raw roll using $S\Delta_{i,k}$, $E\Delta_{i,k}$, and $T\Delta_{i,k}$. The patterns for each of the sub-rolls can then be generated using constraints (1)-(3). The parameter $\vec{WI_{\vec{i}}}$ in the constraints (1)-(3) will be equal to the width of each sub-roll.

All of these generated patterns can then be combined with $PO_{p,j}$ to obtain the final set of the patterns. While combining patterns, due consideration should be given to blade consumption and minimum blade separation constraints. Blade separation is considered during the logical steps of pattern generation. It should be noted that this consideration will help ensure that when a raw roll with major defect(s) is utilized to fill customer orders, all the sub-rolls from that particular defective roll get used.

The pattern generation for defective raw rolls with both types of defects is simply a combination of the separate procedures explained above for each type of defect.

Association of Patterns to Raw Rolls (Matching)

Once the patterns are generated, the patterns are matched to the raw rolls including good raw rolls, raw rolls with minor defects, and sub-rolls produced from raw rolls having major defects. This matching simply associates the charting patterns determined during pattern generation as described above with the available stock on the basis of the various attributes such as width, length, quality, and quantity. This matching, for example, can be implemented by the use of suitable rules or otherwise.

Optimal Selection of Matching Patterns to Raw Rolls

During optimal pattern selection, it should be remembered that all firm orders considered for charting should get filled completely. Optional orders and stock are used just to improve trim efficiency. When it is decided to use a particular raw roll, the roll should by used up completely. An integer decision variable $y_{\vec{i}}$ may be used to indicate the used number of raw rolls from the group $\vec{i}$.

There are at least two ways of charting a raw roll, namely two deep charting (including two deep mixed length charting) and one deep charting. As mentioned before, the parameter $PI_{p,\vec{i}}$ indicates the pattern and raw roll group suitability. If a pattern p is suitable for a raw roll group $\vec{i}$, an integer decision variable $n_{p,\vec{i}}$ gives the number of times the pattern p is used in raw roll group $\vec{i}$.

Constraints

As given by the following inequality, the summation of the length of all the patterns used for raw roll group $\vec{i}$ should be less than the length of the used raw rolls in raw roll group $\vec{i}$:

$$\sum_{p=1}^{P_{\vec{i}}} (LP_p)(1 - ULP_p)(n_{p,\vec{i}}) \leq (\vec{LI}_{\vec{i}})(y_{\vec{i}}) \quad \forall \vec{i} \quad (4)$$

where $LP_p$ is the length of pattern p. The term $ULP_p$ is the under length tolerance allowed for pattern p and is the minimum of the under length tolerances $(L_j - L_{jmin})/L_j$ that are allowed for the orders which are present in pattern p. The length of raw roll group, $\vec{LI}_{\vec{i}}$, is the average length of all the raw rolls which belong to raw roll group $\vec{i}$.

Equation (4) ensures that, if no raw roll is used from raw roll group $\vec{i}$, then no pattern will be filled from that particular raw roll group. It should be noted that Equation (4) applies to one deep charting, to two deep charting, and to two deep mixed length charting. However, some amount of post processing is needed while actually mapping patterns to used number of raw rolls from the raw roll group $\vec{i}$.

Similarly, $$\sum_{p=1}^{P_{\vec{i}}} (LP_p)(1 + OLP_p)(n_{p,\vec{i}}) \geq (\vec{LI}_{\vec{i}})(y_{\vec{i}}) \quad \forall \vec{i} \quad (5)$$

The term $OLP_p$ is the over length tolerance allowed for the pattern p. This term is the minimum of the over length tolerances $(L_{jmax} - L_j)/L_j$ that are allowed for the orders which are present in the pattern p.

The total number of raw rolls that are used should not be greater than the total available raw rolls for that particular raw roll group $\vec{i}$. That is, $$y_{\vec{i}} \leq N_{\vec{i}} \forall \vec{i} \quad (6)$$

The following constraint is included to ensure that all of the used raw rolls are used completely:

$$\sum_{p=1}^{P_{\vec{i}}} n_{p,\vec{i}} = (y_{\vec{i}}) \sum_{p=1}^{P_{\vec{i}}} \left\lfloor \frac{\vec{LI}_{\vec{i}}}{(LP_p)(1 - ULP_p)} \right\rfloor \quad \forall \vec{i} \quad (7)$$

where $\lfloor \cdot \rfloor$ is the round down operator. The maximum number of patterns for each used raw roll should not be greater than the maximum allowed patterns MAXP as given by the following:

$$\sum_{p=1}^{P_{\vec{i}}} n_{p,\vec{i}} \leq (MAXP)(y_{\vec{i}}) \quad \forall \vec{i} \quad (8)$$

The customer provides an upper limit MI on the number of raw rolls to be cut. Therefore, the summation of all the used raw rolls should be less than the customer given number MI as given by the following:

$$\sum_{\vec{i}=1}^{\vec{I}} y_{\vec{i}} \leq MI \quad (9)$$

The demand for all must-make-orders should be filled either by using the raw rolls or by using the available stock (if any). Thus, $$\sum_{\vec{i}=1}^{\vec{I}} \sum_{p=1}^{P_{\vec{i}}} (PO_{p,j})(n_{p,\vec{i}}) + s_j \geq Q_{j\min} \quad \forall j \quad (10)$$

where $s_j$ is a free integer variable to indicate the number of raw rolls used from stock for order j (if order j is a standard order).

A positive value of $s_j$ indicates use from stock, while a negative value represents add to stock. However, the number of extra rolls produced for an order j (firm or optional) should be less than the maximum allowed as given by the following:

$$\sum_{\vec{i}=1}^{\vec{T}} \sum_{p=1}^{P_{\vec{i}}} (PO_{p,j})(n_{p,\vec{i}}) + s_j \leq Q_{j\max} \quad \forall \, j \quad (11)$$

If the order is optional, then $Q_{jmin}$ for that order is set equal to zero, and $Q_{jmax}$ is set equal to the optional order quantity. The stock level should be within a safe limit $SS_j$ and a peak limit $PS_j$ for each standard order j. Therefore, $$SS_j \leq CS_j - s_j \leq PS_j \forall j \quad (12)$$

where $CS_j$ is the current stock for order j. The customer has the flexibility to set the values for safe and peak stock limits for different standard orders as per the current business needs. It should be noted that there might be additions to stock for one order and use from stock for another order to increase the yield. The number of raw rolls which are going to expire in the near future (i.e., $\lambda I_i \leq ADL$, where ADL is the customer specified limit on allowed days before expiration) for group $\vec{i}$ is known from parameter $NE_{\vec{i}}$.

The following constraint gives the number of the ageing raw rolls in group $\vec{i}$ which are not used:

$$na_{\vec{i}} \geq NE_{\vec{i}} - y_{\vec{i}} \forall \, \vec{i} \quad (13)$$

It should be noted that, if the number of used raw rolls in a particular raw roll group is greater than the number of ageing rolls for that particular group, then the decision variable $na_{\vec{i}}$ has a value of zero.

The grouping of raw rolls helps to reduce the number of integer variables, and thereby improves the performance of the optimization model. This grouping also helps to use raw rolls of increasing age, which is an added advantage.

Objective Function

The objective of the optimization model is to minimize loss due to charting and due to ageing according to the following objective function:

$$LOSS = \sum_{\vec{i}=1}^{\vec{T}} \sum_{p=1}^{P_{\vec{i}}} (\overrightarrow{WI}_{\vec{i}} - WP_p)(LP_p)(n_{p,\vec{i}}) + \sum_{\vec{i}=1}^{\vec{T}} (\overrightarrow{WI}_{\vec{i}})(L\vec{I}_{\vec{i}})(na_{\vec{i}}) + \sum_{\vec{i}=1}^{\vec{T}} y_{\vec{i}} \quad (14)$$

where $\overrightarrow{WI}_{\vec{i}}$ is the width of a raw roll in group $\vec{i}$, $WP_p$ is the width of the cutting patterns for the raw roll group $\vec{i}$ within the limits $\overrightarrow{WI}_{\vec{i}}$ and $\overrightarrow{WI}_{\vec{i} \, min}$, $LP_p$ is the length of the cutting patterns for the raw roll group $\vec{i}$, $\overrightarrow{LI}_{\vec{i}}$ is the average length of all the raw rolls which belong to raw roll group $\vec{i}$, $y_{\vec{i}}$ is an integer decision variable used to indicate the used number of raw rolls from the group $\vec{i}$, $n_{p,\vec{i}}$ is the number of patterns p to be applied to raw roll group $\vec{i}$, and $na_{\vec{i}}$ is the number of the ageing raw rolls in group $\vec{i}$. The second term in the objective function is to accommodate the loss due to non-usage of those raw rolls (defective or good) which are going to expire in near future (e.g., 0-2 days). The last term in the objective function is included to select that solution which uses less raw rolls if there is more than one solution that gives the same trim loss.

This objective function minimizes loss (e.g., minimizes the unused portions of raw rolls following charting) and maximizes the utilization of available stock of product and raw rolls (e.g., by ensuring that raw rolls including minor and major defects are use to the extent possible). However, it should be understood that the present invention could be arranged to minimize loss without maximizing stock utilization or to maximize stock utilization without minimizing loss.

Figure 1:
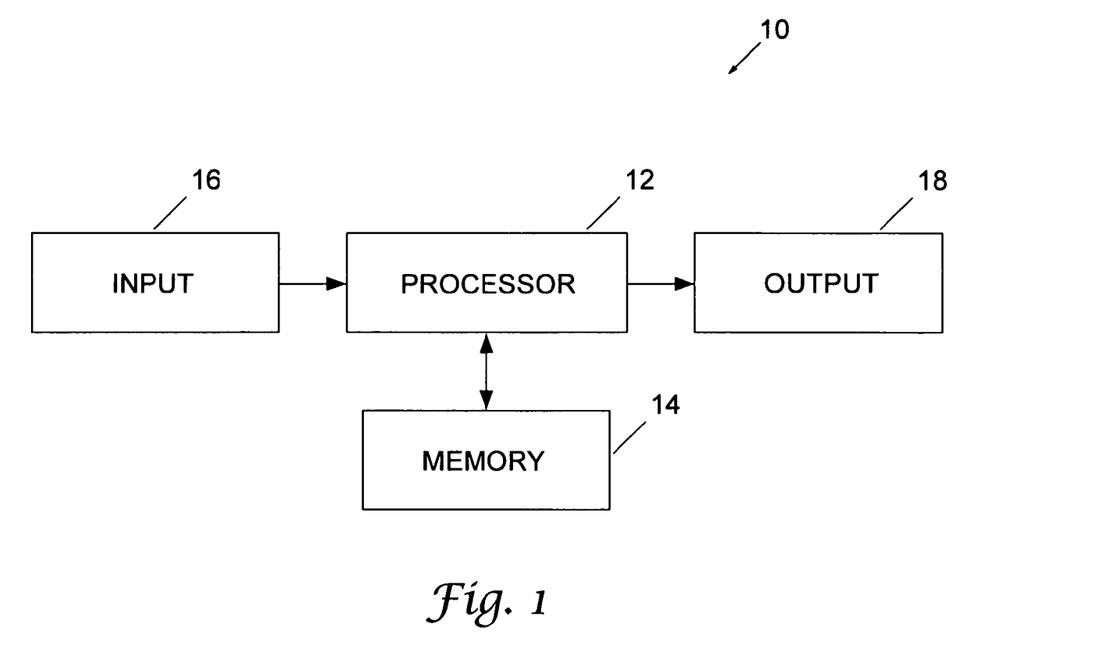
FIG. 1 illustrates an order charting system that is useful in implementing an optimization model according to an embodiment of the present invention.

The above optimization model can be implemented in connection with an order charting system 10 shown in FIG. 1. The order charting system 10 includes a processor 12, a memory 14, an input device(s) 16, and an output device(s) 18.

Figure 2:
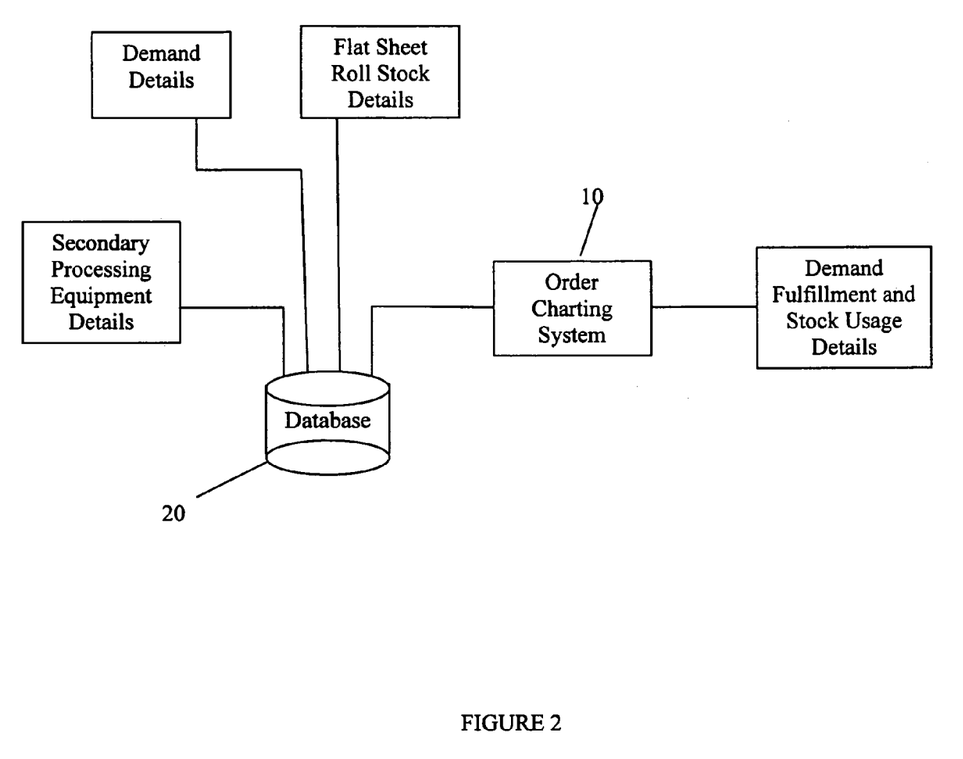
FIG. 2 illustrates additional details of the of the order charting system of FIG. 1; and, FIG. 3 is a flow chart of an embodiment of an optimization program that can be executed by the order charting system of FIGS. 1 and 2.

As shown in FIG. 2, the memory 14 includes a database 20 that is used to store various information entered by the input device 16 or otherwise. For example, the database 20 stores the customer order related data referred to in FIG. 2 as demand details. This customer order information for each order j can include, for example, the width $W_j$, length $L_j$, quantity $Q_j$, the number MI of rolls ordered by the customer, the safe limit $SS_j$, the peak limit $PS_j$, and customer specified limit ADL on the allowed days before expiration ADL.

Also, the database 20 stores flat sheet roll stock details for the raw stock that is available for charting. These details can include, for example, width, length, quality, defects, aging, and quantity data for each available raw roll group.

Moreover, the database 20 stores secondary processing equipment details for the equipment that is to be used to chart the available raw stock. These details can include, for example, the width of the raw roll consumed by each knife of the secondary processing equipment, the lower and upper limits on the separation between blades of the secondary processing equipment, and the maximum number of knives used by the secondary processing equipment.

In addition, the database 20 can store additional data such as the maximum allowed patterns MAXP and the limit $\eta_{max}$ on the number of product rolls for each cutting pattern.

All of this data is stored in the database 20 of the memory 14 for further processing.

In addition, the memory 14 stores an optimization program 30 described above and shown by way of the flow chart of FIG. 3 that is executed by the order charting system 10 to optimally chart the patterns resulting from the customer orders onto the available raw rolls and, as shown in FIG. 2, to output the demand fulfillment and stock usage details that are used by the secondary processing equipment to produce the product rolls from the raw rolls according to the optimal charting patterns.

The output device 18 receives the demand fulfillment and stock usage details. The output device 18, for example, can be a display device that displays the demand fulfillment and stock usage details to a user who can then enter this information into the secondary processing equipment in order to fill the customer orders. Alternatively, the output device 18 can be a drive or other device that copies the demand fulfillment and stock usage details onto computer readable media that can then be transferred to the secondary processing equipment that is used to fill the customer orders. As a further alternative, the output device 18 can itself be the secondary processing equipment that directly receives the demand fulfillment and stock usage details and uses this information to fill customer orders from matching raw rolls as determined by the demand fulfillment and stock usage details.

Figure 3:
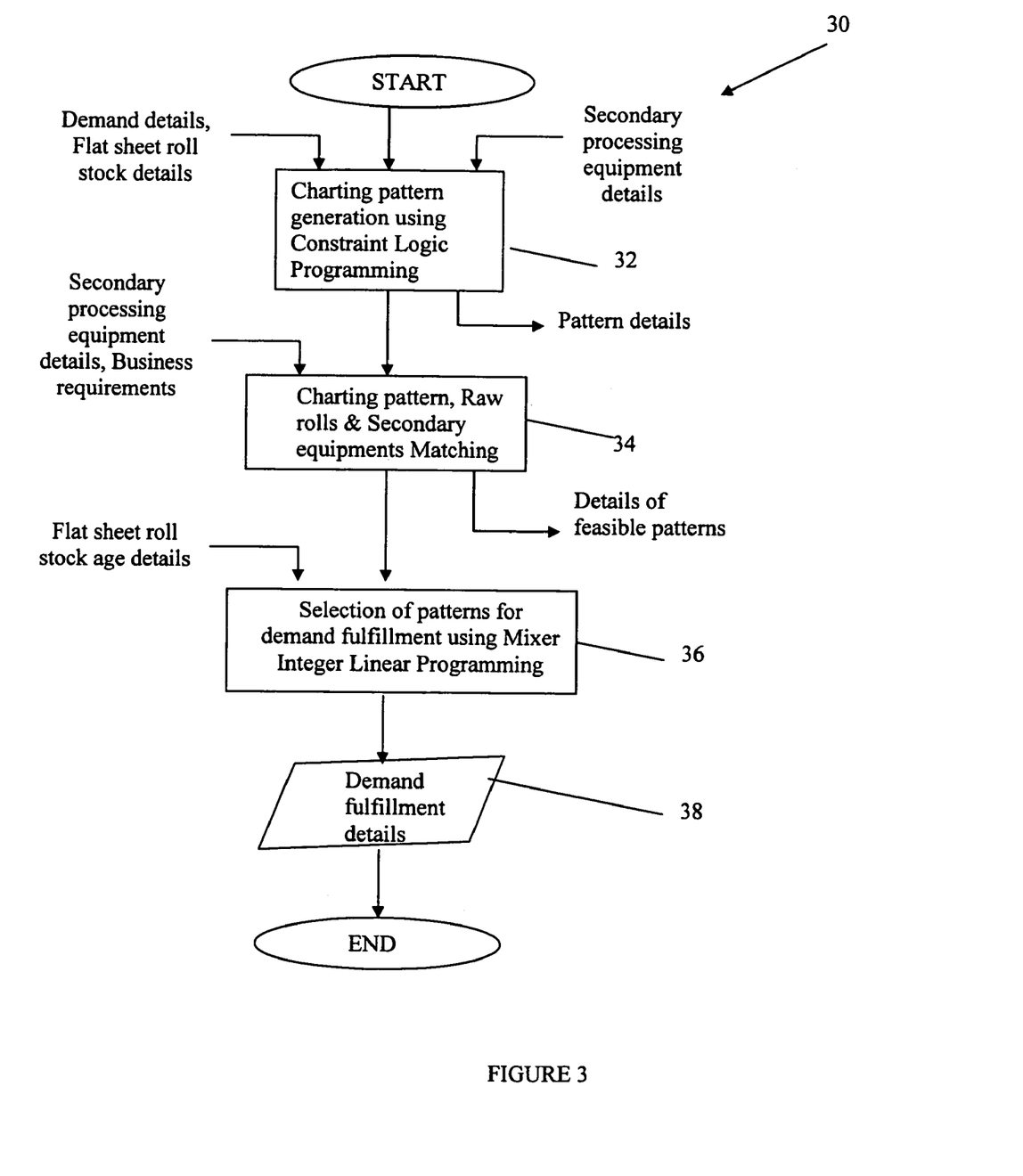

When executing the optimization program 30, the processor 12 at 32 generates the charting patterns using constraint logic programming as described above. Accordingly, the processor 12 reads the demand details given by the customer orders that are being charted, the flat sheet roll stock details relating the available stock that can be used to fill the customer orders, and certain details about the secondary processing equipment details such as blade consumption.

For example, the processor 12 reads the demand details for each order j that can include the width $W_j$, length $L_j$, quantity $Q_j$, the number MI of rolls ordered by the customer, the safe limit $SS_j$, the peak limit $PS_j$, and the customer specified limit ADL on the allowed days before expiration ADL. Also, the processor 12 reads the flat sheet roll stock details for the raw stock that is available for charting. These details can include, for example, width, length, quality, defects, aging, and quantity data for each available raw roll group. Moreover, the processor 12 reads certain of the secondary processing equipment details for the equipment that is to be used to chart the available raw stock. These details can include, for example, the blade consumption $\beta$ and the limit $\eta_{max}$ for the secondary processing equipment to be used in filling the customer orders J.

Based on this read information, the processor 12 generates charting patterns according to equations (1)-(3). Thus, the raw rolls are divided into groups based on the flat sheet roll stock data. As explained above, each group contains rolls having the same width and length within certain tolerances as described above. Any raw rolls in the group that contain defects can be designated as such. Also, the two dimensional matrices, $SA_{i,k}$, $EA_{i,k}$, and $TA_{i,k}$ can be set up based on the defect information contained in the flat sheet roll stock data. Alternatively, the grouping information and defect matrices can be determined beforehand and read by the processor 12.

The cutting patterns $PO_{p,j}$ are generated based on good raw rolls (those having no defects) subject to the constraints (1)-(3) and the corresponding customer order and raw roll details as well as on certain information such as the blade consumption $\beta$ and the limit $\eta_{max}$.

In order to maximize stock utilization, charting patterns are also generated for those raw rolls having minor and major defects subject to the constraints (1)-(3). Accordingly, the raw rolls containing minor defects are sequenced using $SA_{i,k}$, $EA_{i,k}$, and $TA_{i,k}$ as described above. Any of the cutting patterns that cannot be cut from a defective raw roll without the knife cutting into a defective area of the defective raw roll are not added to the possible charting patterns. Also, raw rolls with major defect(s) are cut into sub-rolls, using $SA_{i,k}$, $EA_{i,k}$, and $TA_{i,k}$, thus removing the bad or defective portions of the original raw rolls. The resulting charting patterns for the raw rolls containing minor defects are added to the charting patterns generated for the good raw rolls. Similarly, the sub-rolls resulting from cutting out the areas from raw rolls containing major defects are charted and these charting patterns are also added to the charting patterns generated for the good raw rolls.

At 34, the charting patterns generated at 32 are matched to the available stock including raw rolls. As discussed above, this matching associates the charting patterns determined during pattern generation as described above with the available stock on the basis of the various attributes such as width, length, quality, and quantity. During matching at 34, the processor 12 uses certain of the details relating to the secondary processing equipment (such as the lower and upper limits on the separation between blades of the secondary processing equipment, and the maximum number of knives used by the secondary processing equipment) in matching the charting patterns generated at 32 to the available flat sheet stock. Thus, if a particular raw roll cannot be cut in accordance with a particular charting pattern because the pattern or the roll fall outside of the lower and upper blade separation limits for the secondary processing equipment or because the cutting will require a number of knives exceeding the maximum number of knives used by the secondary processing equipment, that pattern and that roll are not matched. The width range and/or diameter/length range for the secondary processing equipment can also be used in matching charting patterns and raw roll or sheet stock. Also for example, the minimum and maximum load (in terms of weight) that particular secondary processing equipment can handle can be considered when matching the charting patterns generated at 32 and the available stock.

At 36, the optimal matches or associations are selected based on mixed integer linear programming such as that described above. In the specific example given above, the processor 12 at 36 uses the constraints (4)-(13) and the objective function of equation (14) to select optimal ones of the matches determined at 34 between one or more charting patterns p and one or more raw roll groups $\vec{i}$.

These optimal matches are then supplied at 38 to the user, to a storage medium, or directly to the secondary processing equipment as disclosed above in order to produce the product rolls ordered by the customers. This process minimizes waste and also maximizes stock utilization.

Certain modifications of the present invention have been discussed above. Other modifications of the present invention will occur to those practicing in the art of the present invention. For example, although the equations discussed above are particularly useful to accommodate industries in which dry film is the stock that is processed to produce product rolls and/or sheets, these equations can be easily modified as necessary to accommodate other flat sheet industries. Indeed, the present invention is equally applicable to other industries, such as the paper industry, that chart flat sheets and/or rolls to produce product flat sheets and/or rolls.

Moreover, certain business requirements can be added to the constraints that are applied during charting pattern generation based on the constraint logic programming. Such business can include, for example, acceptable trim loss for each pattern, alternate style replacement, standard order dimensions, etc. With respect to acceptable trim loss for each pattern, each charting business might have a requirement such that the trim loss for each pattern must be below an acceptable trim loss. For example, if the width of a raw roll is 7 meters and the acceptable trim loss is 0.25 m, then a pattern that does not utilize a minimum of 6.75 m in width of the raw roll is not acceptable, even if the overall trim efficiency for the solution is high. With respect to alternate style replacement, each charting business might determine that an alternate style product can be supplied for a particular order or to a particular customer based on the business relationship or business potential with that particular customer. With respect to standard order dimensions, each charting business can define its own standard order dimensions based on its history of customer orders.

Also, the constraint logic programming utilized in charting pattern generation can use winding direction as a constraint. There are two winding directions, namely wire and felt directions. The customer may ask for a specific direction.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of producing optimal charting patterns for raw rolls and/or sheets of flat sheet stock, the method implemented by a processing system, the method comprising:
   generating charting patterns using constraint logic programming;
   matching the generated charting patterns and available raw rolls and/or sheets of flat sheet stock; and,
   selecting the optimal patterns from those matching generated charting patterns and available raw rolls and/or sheets using mixed integer linear programming.

2. The method of claim 1 wherein the generating of charting patterns comprises constraining the generated charting patterns based on customer supplied order width and diameter or length.

3. The method of claim 1 wherein the generating of charting patterns comprises constraining the generated charting patterns based on raw rolls and/or sheet information and on constraints related to width and diameter or length of raw rolls and/or sheets.

4. The method of claim 1 wherein the generating of charting patterns comprises constraining the generated charting patterns based on blade consumption.

5. The method of claim 1 wherein the generating of charting patterns comprises constraining the generated charting patterns based on customer supplied order width and diameter or length and based on raw rolls and/or sheet information and on constraints relating to width and diameter or length of raw rolls and/or sheets.

6. The method of claim 1 wherein the generating of charting patterns comprises constraining the generated charting patterns based on customer supplied order width and diameter or length, based on constraints on width and diameter or length of raw rolls and/or sheets, and based on blade consumption.

7. The method of claim 1 wherein the matching of the charting patterns and available raw rolls and/or sheets of flat sheet stock comprises matching the charting patterns, available raw rolls and/or sheets of flat sheet stock, and secondary processing equipment.

8. The method of claim 7 wherein the matching of the charting patterns, available raw rolls and/or sheets of flat sheet stock, and secondary processing equipment comprises constraining the matching of the charting patterns, available raw rolls and/or sheets, and secondary processing equipment based on pattern width, pattern length/diameter, raw roll width, raw roll diameter/length, minimum blade separation, width and diameter/length range for secondary processing equipment.

9. The method of claim 1 wherein the selecting of the optimal patterns comprises selecting the optimal patterns from those matching charting patterns and available raw rolls and/or sheets that minimize waste of the available raw rolls and/or sheets.

10. The method of claim 1 wherein the selecting of the optimal patterns comprises selecting the optimal patterns from those matching charting patterns and available raw rolls and/or sheets that maximize stock utilization.

11. The method of claim 1 wherein the selecting of the optimal patterns comprises selecting the optimal patterns from those matching charting patterns and available raw rolls and/or sheets that minimize waste of the available raw rolls and/or sheets and maximize stock utilization.

12. The method of claim 1 wherein the selecting of the optimal patterns comprises constraining the selection from those matching charting patterns and available raw rolls and/or sheets so as to completely use all raw rolls and/or sheets used to fill an order based on length tolerances of the order.

13. The method of claim 1 wherein the selecting of the optimal patterns comprises constraining the selection from those matching charting patterns and available raw rolls and/or sheets so as to give preference to the use of aging raw rolls and/or sheets.

14. The method of claim 1 wherein the selecting of the optimal patterns comprises constraining the selection from those matching charting patterns and available raw rolls and/or sheets so as to produce customer product rolls between minimum and maximum quantity limits.

15. The method of claim 1 wherein the selecting of the optimal patterns comprises constraining the selection from those matching charting patterns and available raw rolls and/or sheets so as to use one or two deep charting based on an upper limit on the total number of distinct patterns per raw roll.

16. The method of claim 1 wherein the matching of the charting patterns and available raw rolls and/or sheets of flat sheet stock comprises matching the charting patterns and available good and defective raw rolls and/or sheets of flat sheet stock.

17. A method of producing optimal charting patterns for raw rolls and/or sheets of flat sheet stock, the method implemented by a processing system, the method comprising:
   generating charting patterns relative to raw rolls and/or sheets of flat sheet stock, wherein the generating of charting patterns is based on customer order information;
   matching the generated charting patterns and available raw rolls and/or sheets of flat sheet stock; and,
   selecting optimally matching generated charting patterns and available raw rolls and/or sheets of flat sheet stock, wherein the selecting of optimally matching generated charting patterns and available raw rolls and/or sheets of flat sheet stock comprises minimizing an objective function, wherein the minimizing of an objective function includes minimizing trim loss when the raw rolls and/or sheets of flat sheet stock are trimmed to fill a customer order, and wherein the objective function includes at least a first term based on matching generated charting patterns to available raw rolls and a second term based on aging raw rolls.

18. The method of claim 17 wherein the generating of charting patterns comprises constraining the generated charting patterns based on customer supplied order width and diameter or length.

19. The method of claim 17 wherein the generating of charting patterns comprises constraining the generated charting patterns based on raw rolls and/or sheet information and/or constraints relating to width and diameter or length of raw rolls and/or sheets.

20. The method of claim 17 wherein the generating of charting patterns comprises constraining the generated charting patterns based on secondary processing equipment limitations relating to blade consumption.

21. The method of claim 17 wherein the generating of charting patterns comprises constraining the generated charting patterns based on customer supplied information relating to order width and diameter or length and based on raw rolls and/or sheet information and/or constraints relating to width and diameter or length of raw rolls and/or sheets.

22. The method of claim 17 wherein the generating of charting patterns comprises constraining the generated charting patterns based on customer supplied information relating to order width and diameter or length, based on raw rolls and/or sheet information and/or constraints relating to width and diameter or length of raw rolls and/or sheets, and based on secondary processing equipment limitations relating to blade consumption.

23. The method of claim 17 wherein the matching of the charting patterns and available raw rolls and/or sheets of flat sheet stock comprises matching the charting patterns, available raw rolls and/or sheets of flat sheet stock, and secondary processing equipment.

24. The method of claim 23 wherein the matching of the charting patterns, available raw rolls and/or sheets of flat sheet stock, and secondary processing equipment comprises constraining the matching of the charting patterns, available raw rolls and/or sheets, and secondary processing equipment based on pattern width, pattern length/diameter, raw roll width, raw roll diameter/length, minimum blade separation, and width and/or diameter/length range for the secondary processing equipment.

25. The method of claim 17 wherein the minimizing of an objective function further comprises minimizing the number of raw rolls and/or sheets of flat sheet stock used to fill a customer order.

26. The method of claim 17 wherein the minimizing of a multiple objective function further includes minimizing loss from not using aged raw rolls and/or sheets of flat sheet stock to fill a customer order.

27. The method of claim 17 wherein the minimizing of a multiple objective function comprises minimizing the number of raw rolls and/or sheets of flat sheet stock used to fill a customer order and minimizing loss from not using aged raw rolls and/or sheets of flat sheet stock to fill a customer order.

28. The method of claim 17 wherein the selecting of optimally matching charting patterns and available raw rolls and/or sheets of flat sheet stock comprises constraining the selection from those matching charting patterns and available raw rolls and/or sheets so as to produce customer product rolls between minimum and maximum quantity limits.

29. The method of claim 17 wherein the selecting of optimally matching charting patterns and available raw rolls and/or sheets of flat sheet stock comprises constraining the selection from those matching charting patterns and available raw rolls and/or sheets so as to use one or two deep charting based on the upper limit on the total number of distinct patterns per raw roll.

30. The method of claim 17 wherein the matching of the charting patterns and available raw rolls and/or sheets of flat sheet stock comprises matching the charting patterns and available goof and defective raw rolls and/or sheets of flat sheet stock.

31. A computer readable memory having program code stored thereon which, when executed, performs the following functions:
    generating charting patterns based on customer order information;
    matching the generated charting patterns and available good and defective raw rolls and/or sheets of flat sheet stock; and,
    selecting optimally matching generated charting patterns and available good and defective raw rolls and/or sheets, wherein the selecting of optimally matching generated charting patterns and good and defective raw rolls and/or sheets comprises minimizing an objective function, and wherein the minimizing of an objective function comprises minimizing waste of the available good and defective raw rolls and/or sheets.

32. The computer readable memory of claim 31 wherein the function of generating of charting patterns comprises the function of constraining the generated charting patterns based on customer supplied information relating to order width and diameter or length.

33. The computer readable memory of claim 31 wherein the function of generating of charting patterns comprises the function of constraining the generated charting patterns based on good and defective raw rolls and/or sheet information based on constraints relating to width and diameter or length of good and defective raw rolls and/or sheets.

34. The computer readable memory of claim 31 wherein the function of generating of charting patterns comprises the function of constraining the generated charting patterns based on secondary processing equipment limitations relating to blade consumption.

35. The computer readable memory of claim 31 wherein the function of generating of charting patterns comprises the function of constraining the generated charting patterns based on customer supplied information relating to order width and diameter or length and based on constraints relating to width and diameter or length of good and defective raw rolls and/or sheets.

36. The computer readable memory of claim 31 wherein the function of generating of charting patterns comprises the function of constraining the generated charting patterns based on customer supplied information relating to order width and diameter or length, based on constraints relating to width and diameter or length of good and defective raw rolls and/or sheets, and based on secondary processing equipment limitations relating to blade consumption.

37. The computer readable memory of claim 31 wherein the function of matching of the charting patterns and available good and defective raw rolls and/or sheets of flat sheet stock comprises the function of matching the charting patterns, available good and defective raw rolls and/or sheets of flat sheet stock, and secondary processing equipment.

38. The computer readable memory of claim 37 wherein the function of matching of the charting patterns, available good and defective raw rolls and/or sheets of flat sheet stock, and secondary processing equipment comprises the function of constraining the matching of the charting patterns, available good and defective raw rolls and/or sheets, and secondary processing equipment based on pattern width, pattern length/diameter, raw roll width, raw roll diameter/length, minimum blade separation, width and diameter/length range for secondary processing equipment.

39. The computer readable memory of claim 31 wherein the function of selecting of the optimal patterns comprises the function of selecting the optimal patterns from those matching charting patterns and available good and defective raw rolls and/or sheets that maximize stock utilization.

40. The computer readable memory of claim 31 wherein the function of selecting of the optimal patterns comprises the function of constraining the selection from those matching charting patterns and available good and defective raw rolls and/or sheets so as to completely use all raw rolls and/or sheets used to fill an order based on length tolerances of the order.

41. The computer readable memory of claim 31 wherein the function of selecting of the optimal patterns comprises the function of constraining the selection from those matching charting patterns and available good and defective raw rolls and/or sheets so as to give preference to the use of aging raw rolls and/or sheets.

42. The computer readable memory of claim 31 wherein the function of selecting of the optimal patterns comprises the function of constraining the selection from those matching charting patterns and available good and defective raw rolls and/or sheets so as to produce customer product rolls between minimum and maximum quantity limits.

43. The computer readable memory of claim 31 wherein the function of selecting of the optimal patterns comprises the function of constraining the selection from those matching charting patterns and available good and defective raw rolls and/or sheets so as to use one or two deep charting based on the upper limit on the total number of distinct patterns per raw roll.

* * * * *